(12) United States Patent
Hiller et al.

(10) Patent No.: US 6,587,299 B1
(45) Date of Patent: Jul. 1, 2003

(54) METHOD FOR OVERCOMING A STICTION CONDITION IN DISK DRIVE

(75) Inventors: Bernhard Hiller, San Jose, CA (US); Glenn Albert, Longmont, CO (US); Dennis Chen, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/493,735

(22) Filed: Jan. 28, 2000

Related U.S. Application Data

(60) Provisional application No. 60/117,766, filed on Jan. 29, 1999.

(51) Int. Cl.$^7$ .......................... G11B 15/46; G11B 21/02
(52) U.S. Cl. ........................ 360/73.03; 360/75; 318/254
(58) Field of Search ........................ 360/69, 75, 73.03, 360/70; 318/254, 437

(56) References Cited

U.S. PATENT DOCUMENTS

| | | | |
|---|---|---|---|
| 4,530,021 A | 7/1985 | Cameron ..................... | 360/97 |
| 5,028,852 A | 7/1991 | Dunfield ..................... | 318/254 |
| 5,254,914 A | 10/1993 | Dunfield et al. ............ | 318/254 |
| 5,258,695 A | 11/1993 | Utenick et al. ............. | 318/138 |
| 5,384,675 A | 1/1995 | Crawforth et al. ........... | 360/75 |
| 5,397,971 A | 3/1995 | McAllister et al. ......... | 318/254 |
| 5,442,266 A | 8/1995 | Morehouse et al. ........ | 318/272 |
| 5,466,997 A | 11/1995 | Utenick et al. ............. | 318/254 |
| 5,495,368 A | 2/1996 | Blatchley et al. ........... | 360/46 |
| 5,530,326 A | 6/1996 | Galvin et al. ................ | 318/254 |
| 5,530,602 A | 6/1996 | Boutaghou et al. .......... | 360/75 |
| 5,532,926 A | 7/1996 | Dunn et al. .................. | 364/178 |
| 5,569,990 A | 10/1996 | Dunfield ..................... | 318/254 |
| 5,729,399 A | 3/1998 | Albrecht et al. .............. | 360/75 |
| 5,801,505 A | 9/1998 | Lee et al. .................... | 318/437 |
| 5,812,345 A | 9/1998 | MacPherson et al. ....... | 360/105 |
| 5,821,713 A | 10/1998 | Holling et al. .............. | 318/439 |
| 5,982,571 A | 11/1999 | Calfee et al. ................. | 360/70 |
| 6,229,663 B1 | 5/2001 | Yoneda et al. ................ | 360/75 |
| 6,369,541 B1 | 4/2002 | Albert ........................ | 318/560 |

*Primary Examiner*—Regina N. Holder
(74) *Attorney, Agent, or Firm*—Tejpal S. Hansra

(57) ABSTRACT

A method for overcoming a stiction condition in a disk drive is disclosed. In one embodiment, the method includes the steps of: (1) providing a plurality of disks each having a pair of disk surfaces, each of the disk surfaces having a corresponding actuator arm assembly including a head; (2) providing a spin motor for rotating said plurality of disks when a stiction condition does not exist; (3) providing a voice coil motor for positioning said heads relative to said disk surfaces when a stiction condition does not exist; (3) providing a microprocessor for controlling application of a voice coil motor current to said voice coil motor and for controlling application of a spin motor current to said spin motor; (4) applying a spin motor current to said spin motor; (5) sensing that the spin motor is not rotating said plurality of disks and, hence, a stiction condition exists; (6) applying a first oscillating current to said voice coil motor in response to said stiction condition, said first oscillating current having a fixed frequency and a first amplitude; (7) determining whether said spin motor is rotating in response to said first oscillating current; and, (8) continuing to apply said first oscillating current for at least one commutation state of said spin motor after determining that said spin motor is rotating in response to said first oscillating current.

54 Claims, 13 Drawing Sheets

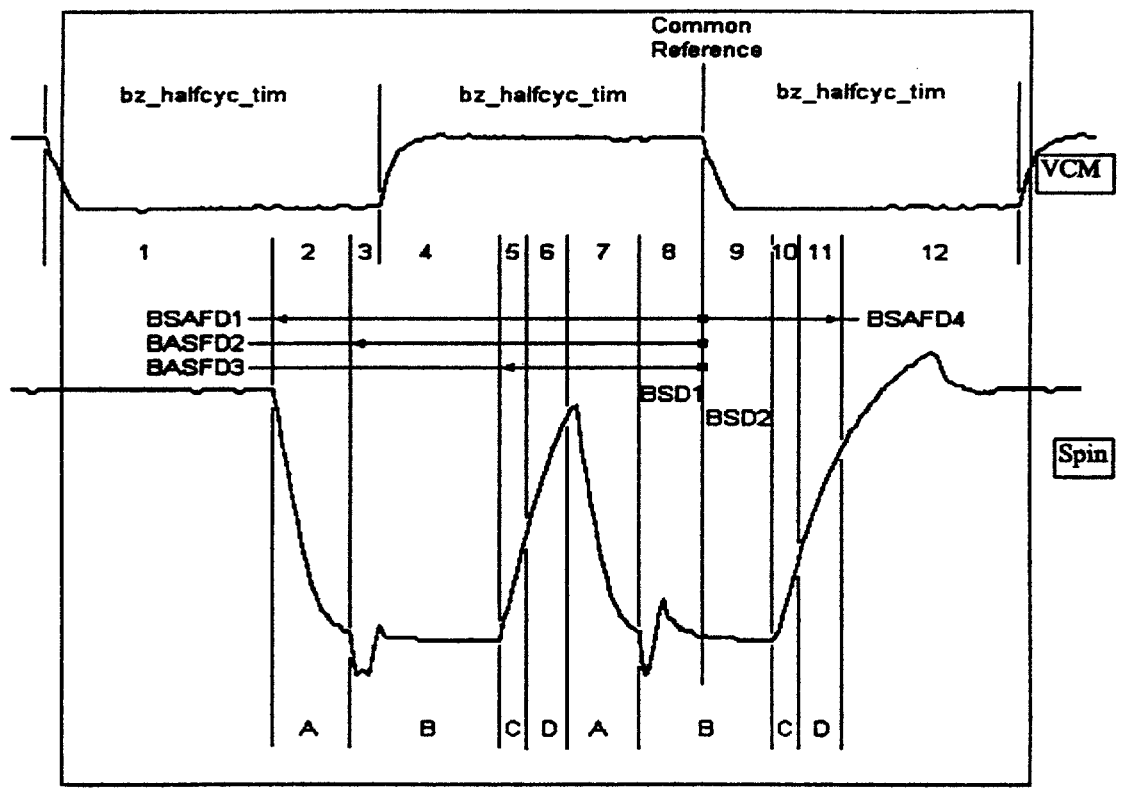

1 = (2 * bz_halfcyc_tim) - BSAFD1
2 = FALL_DLY1
3 = BSAFD2 - bz_halfcyc_tim
4 = bz_halfcyc_tim - BSAFD3
5 = RISE_DLY1 + A2D_TIM
6 = RISE_DLY2 + A2D_TIM

7 = FALL_DLY1
8 = BSD1
9 = BSD2
10 = RISE_DLY1 + A2D_TIM
11 = RISE_DLY2 + A2D_TIM
12 = bz_halfcyc_tim - BSAFD4 where: (all units are in microseconds)

C = RISE_DLY1 = 40
D = RISE_DLY2 = 75
RISE_DLYS = RISE_DLY1 + RISE_DLY2 + (2 * A2D_TIM)

A = FALL_DLY1 = 150
B = FALL_DLY2 = 250
FALL_DLYS = FALL_DLY1 + FALL_DLY2

BSD1 = 100
BSD2 = FALL_DLY2 - BSD1
BSAFD1 = FALL_DLYS + RISE_DLYS + FALL_DLY1 + BSD1
BSAFD2 = BSAFD1 - FALL_DLY1
BSAFD3 = BSAFD2 - FALL_DLY2
BSAFD4 = BSD2 + RISE_DLYS

A2D_TIM = 6

*Fig. 13*

METHOD FOR OVERCOMING A STICTION CONDITION IN DISK DRIVE

RELATED APPLICATIONS

The present application claims priority under 35 U.S.C. §119(e) from U.S. Provisional Patent Application Serial No. 60/117,766, filed Jan. 29, 1999, which provisional application is incorporated herein by reference in its entirety.

FIELD OF THE INVENTION

The present invention relates to magnetic storage devices and, more particularly, to a method for overcoming a stiction condition in a disk drive.

BACKGROUND OF THE INVENTION

FIG. 1 illustrates a perspective view of a conventional disk drive 10. The disk drive 10 includes at least one disk 12 that is rotated by a spin motor 14. The spin motor 14 is mounted to a base plate 16. An actuator arm assembly 18 is also mounted to a base plate 16.

The actuator arm assembly 18 includes a head 20 mounted to a flexure arm 22 which is attached to an actuator arm 24 that can rotate about a bearing assembly 26. The actuator arm assembly 18 also contains a voice coil motor 28 which moves the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a memory device (e.g., a random access memory (RAM) device and a read only memory (ROM) device). It should be understood that typical disk drives (like disk drive 10) normally include a plurality of disks 12 and, therefore, a plurality of corresponding actuator arm assemblies 18.

FIG. 2 is a simplified diagrammatic representation of perspective view of a head 20 showing its air-bearing surface, wherein the air-bearing surface is comprised of three pads 21a, 21b and 21c. As shown in FIG. 2, the head 20 includes an air-bearing slider 34 and a transducer 36.

When the spin motor 14 rotates the disk 12, the head 20 floats above (or below) the disk 12 on a small cushion of air due to the aerodynamic characteristics of the air-bearing slider 34. When the disk 12 is brought to a stopped condition, there is no aerodynamic cushion available to float the head 20 above the disk 12 and, therefore, the head 20 lands on the disk 12. Consequently, to prevent damage to disk 12, each disk surface 38 (see FIG. 3) includes a landing zone 40 onto which the head 20 is usually parked. The landing zone 40 is usually a textured area of the disk surface 38 where data is not normally stored. In contrast, the disk surface 38 also includes a data zone 42, which is designed to be extremely smooth for a number of reasons which are not of particular significance for this application. Once the head 20 has been parked in landing zone 40, a latch (not shown) is used to lock the head 20 over the landing zone 40 to prevent undesired movement of the head 20 from the landing zone 40 onto the data zone 42 due to shocks to the drive (e.g., dropping or bumping the drive). In some instances, shocks experienced by the disk drive 10 are such that the latch fails. In these instances, the head 20 may still be in the landing zone 40 without the latch in place or the head 20 may be displaced into the data zone 42.

Typically, once a head 20 has been parked in the landing zone 40, the spin motor 14 is activated which has a torque which is generally sufficient to lift the head 20 into a flying condition over the disk surface 38. In certain instances, however, the head 20 adheres to the disk surface 38 in such a manner that the torque of the spin motor 14 is insufficient to lift the head 20 into a flying condition. This phenomenon is known as stiction.

Stiction may occur when the head 20 is either at rest in the landing zone 40 (whether latched or unlatched) or when the head 20 is at rest in the data zone 42. Generally, stiction is a greater problem when the head 20 is at rest in the data zone 42 since the data zone 42 is smooth and, therefore, the contact area between the head 20 and the data zone 42 is large (as compared to the textured landing zone 40). It must be noted, however, that stiction may also occur in the landing zone 40, for example, when lubricants normally found on the disk surface 38 have migrated to the interface between the head 20 and the disk surface 38 causing a meniscus effect. Other reasons for stiction are well-known in the art.

Because stiction is a significant problem and may render a disk drive inoperable, a number of techniques have been devised in an attempt to overcome stiction conditions. For example, U.S. Pat. No. 4,530,021 entitled "Micromotion Release of Heads from Lubricated Magnetic Disks" discloses a generally triangular waveform of relatively short duration that is supplied to the coils of the voice-coil motor prior to supplying power to rotate the disks. According to FIG. 1 of U.S. Pat. No. 4,530,021, the generally triangular waveform may also be applied while power is supplied to rotate the disks.

Another example is found in U.S. Pat. No. 5,397,971 entitled "Bi-Polar Disk Torquing System for a Disk Drive to Free Stuck Transducers." U.S. Pat. No. 5,397,971 discloses a method of exciting the spin motor with bi-polar pulses of direct current at substantially the resonant frequency of the rotating assembly to free stuck transducers. The back EMF is sensed from the spin motor to detect rotation.

Another example is found in U.S. Pat. No. 5,384,675 entitled "Disk Drive With Controlled Actuator Oscillation for Release of Head Carriers." U.S. Pat. No. 5,384,675 discloses applying a series of alternating current pulses to an actuator to dither head carriers at an initial frequency that is generally equal to or above the resonant frequency of the actuator systems with stuck carriers. The frequency and amplitude of the pulses are swept downward from the initial frequency and amplitude, and is repeated until the drive motor rotates at its operating speed.

Yet another example is found in U.S. Pat. No. 5,530,602 entitled "Disk Drive Micromotion Starting Apparatus and Method." U.S. Pat. No. 5,530,602 discloses a method of applying a series of alternating current bursts to the voice coil motor, beginning with a lowest amplitude burst. Each succeeding current burst is of increased amplitude. During each burst, the pulse frequency is varied progressively through a range of values, wherein the range of selected frequencies are selected to enable the frequency of some of the burst pulses to approach the resonant frequency of one or more modes of disk vibration. A sensor connected to the spindle motor coils responds to the presence of a back EMF, indicating that the heads are no longer adhered to the disk surfaces and that rotation has begun.

Yet a further example is found in U.S. Pat. No. 5,801,505 entitled "Disk Drive Stiction Release System." U.S. Pat. No. 5,801,505 discloses a method of pulsing the spindle motor and/or the actuator motor if stiction occurs during start-up. Because the resonant frequency of the spindle motor varies depending upon the number of heads that are stuck, pulses are applied over a varying range of frequencies, including the various resonant frequencies of the spindle motor corresponding to various numbers of heads stuck.

It should be understood that the above discussion of the aforementioned patents is only intended to be a brief discussion of each of the patents. To obtain a full understanding of the entire disclosure of such patents and the information contained therein, reference should be made to the patents themselves.

While the above patents provide a number of different alternatives for overcoming stiction conditions, it would be beneficial to provide a relatively simple yet effective technique for overcoming stiction conditions. In addition, it would be beneficial to provide a technique which reduces occurrences of re-stiction.

SUMMARY OF THE INVENTION

The present invention is designed to overcome the aforementioned problems and meet the aforementioned, and other, needs.

A method for overcoming a stiction condition in a disk drive is disclosed. In one embodiment, once a stiction condition is sensed due to non-movement of the spin motor, a microprocessor controls the application of a first oscillation current to a voice coil motor in order to dither stuck heads. The first oscillation current has a fixed frequency which corresponds to the resonant frequency of the lateral bending modes of the disk drive. The first oscillation current has an amplitude which, in combination with forces generated by the spin motor, has a force that roughly corresponds with freeing one stuck head. If application of the first oscillation current causes the spin motor to begin rotation, the first oscillating current continues to be applied for at least one commutation state of the spin motor, so as to minimize occurrences of re-stiction.

If the spin motor has failed to begin rotation after application of the first oscillating current, a second oscillating current is applied having a frequency equal to the fixed frequency and a second amplitude greater than the first amplitude. The second oscillating current may have a second amplitude which, in combination with forces generated by the spin motor, has a force that roughly corresponds with freeing three stuck heads. If application of the second oscillation current causes the spin motor to begin rotation, the second oscillating current continues to be applied for at least one commutation state of the spin motor, so as to minimize occurrences of re-stiction.

If the spin motor has failed to begin rotation after application of the second oscillating current, the process may be repeated. In each case, however, the amplitude of the nth oscillating current is greater than amplitude of the $(n-1)^{th}$ oscillating current, but the frequency of each of the oscillating currents is equal to the fixed frequency.

In one embodiment, one or more of the oscillating currents are sinusoidal waveforms, which excite fewer resonances and, therefore, are less audible. To reduce the burden on the microprocessor and to avoid calculation delays, the values of the sinusoidal waveform are preferably stored in a look-up table.

Other objects, features and advantages of the invention will be apparent from the following specification taken in conjunction with the following drawings.

DETAILED DESCRIPTION OF THE PREFERRED EMBODIMENT

Figure 1:
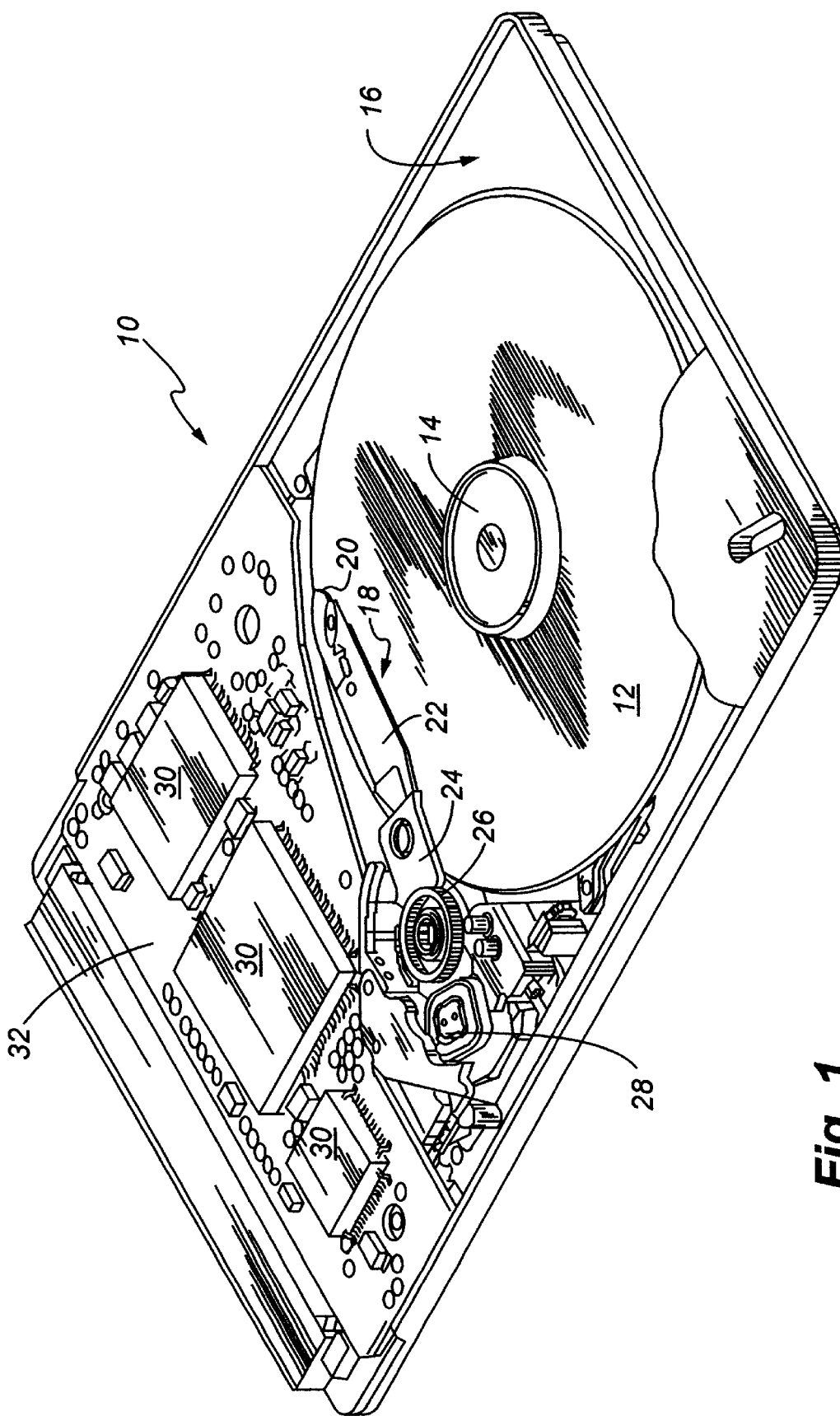
FIG. 1 illustrates a perspective view of a conventional disk drive system.
Figure 2:
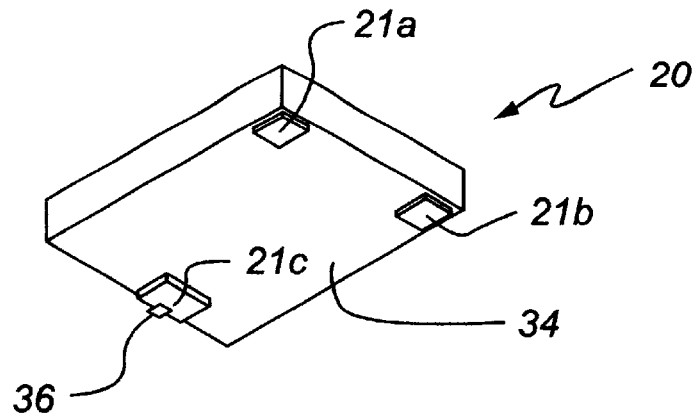
FIG. 2 is a diagrammatic representation of a perspective view of a head for the disk drive system shown in FIG. 1.
Figure 3:
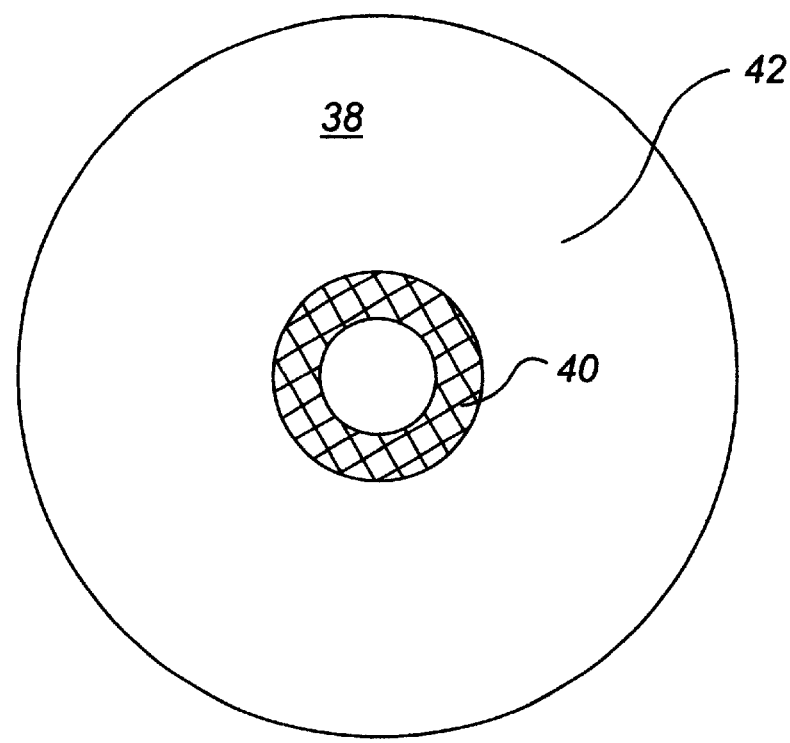
FIG. 3 is a diagrammatic representation of a top view of a disk surface illustrating a landing zone and a data zone.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

In developing a technique to solve problems associated with stiction conditions, the inventors of the present invention determined that a voice coil motor (VCM) for a disk drive should be supplied with a signal having a frequency that corresponds to the resonant frequency of a disk drive actuator arm's lateral bending modes when all of the drive's heads are stuck in the data zone. A particular four-disk disk drive having eight heads may have a resonant frequency of 800 Hz, for example, to optimally excite its lateral bending modes. The resonant frequency necessary to optimally excite a particular disk drive's lateral bending modes when all heads are stuck may be determined experimentally or by modeling techniques known to those skilled in the art. This information is then stored, for example, in a disk drive's firmware or in non-volatile memory.

By supplying an oscillating current to the VCM, the heads in the disk drive will begin to oscillate (also known as dithering or buzzing) which will have a tendency to free the heads from their stiction condition. The oscillating current supplied to the VCM may take on a variety of forms including a square wave, a triangular wave or a sinusoidal wave, among others. The inventors have determined that, preferably, the oscillating current supplied to the VCM should be a sinusoidal waveform, since it excites much fewer undesired resonances and, therefore, is less audible (when dithering is being performed) than a square wave. Because it may be taxing on the microprocessor of the disk drive to calculate the sinusoidal waveform "on-the-fly," preferably, the sinusoidal waveform is stored in a look-up table to reduce the burden on the microprocessor and to avoid calculation delays.

In addition to applying an oscillating current to the VCM, a DC current is supplied to the spin motor in an effort to overcome a stiction condition. Preferably, application of the maximum spin motor current to the spin motor and the oscillating current to the VCM are synchronized. In other words, once a stiction condition has been sensed due to non-rotation of the spin motor (after application of a start-up current to the spin motor), application of the current to the spin motor ceases. Subsequently, the oscillating current to the VCM is applied in synchronization with the application of the maximum spin motor current to the spin motor.

When applying an oscillating current to the VCM, it is important to ensure that the combination of the current supplied to the VCM and the current supplied to the spin motor do not result in forces on a stuck actuator arm that exceeds its yield strength. Accordingly, current levels supplied to the VCM are preferably provided at three different levels (wherein the current is applied from its lowest level to its highest level, as necessary), which roughly correspond to 1 head being stuck, 3 heads being stuck and 5 heads being stuck. For example, in one four-disk disk drive having eight heads, the three current levels are 175 mA, 300 mA and 600 mA. In addition, each of these current levels (when the heads continue to remain stuck) are applied for a relatively short duration (e.g., 120 ms) to reduce disturbances to the disk drive's owner/user and to reduce the amount of time necessary for the dithering operation, since the inventors have experimentally determined (in a four-disk disk drive with eight heads) that application of current levels for durations longer than approximately 80 ms generally does not enhance performance of the technique.

In order to determine whether the stiction condition has been overcome, the spin motor is monitored. U.S. patent application Ser. No. 09/493,737 (now U.S. Pat. No. 6,369,541) entitled "Rotary Position Sensing During Rotor Acceleration in an Electric Motor" by Glenn Albert (identified as Attorney Docket No. 3123-300), filed on even date herewith, discloses a technique for monitoring a spin motor and is incorporated herein by reference. In contrast to other techniques for monitoring the rotation of a spin motor (e.g., those which rely on sensing of a back EMF), the technique disclosed in U.S. patent application Ser. No. 09/493,737 uses relative inductance measurements of the motor windings to detect rotor position. Instead of halting the application of an oscillating current to the VCM upon sensing rotation of the spin motor, preferably, the oscillating current is provided to the VCM for at least one commutation state (preferably, only one commutation state) after movement of the spin motor has been sensed. By doing so, the likelihood of re-stiction is reduced. That is, in some cases, if the oscillating current is removed too quickly after sensing rotation of the spin motor, friction from heads which are not yet flying (i.e., dragging heads) will slow down the spindle and a stiction condition may again exist. This problem may be reduced by using the above-described technique.

As an alternative to applying the oscillating current to the VCM for one commutation state, the oscillating current may be applied for a fixed duration greater than the time period associated with one commutation state. It should be noted, however, that the fixed duration should be minimized so as to avoid head/disk damage due to prolonged application of the oscillating current.

In some cases, it may be advantageous to move the stuck heads towards the landing zone once they become unstuck. Accordingly, as will be understood by those skilled in the art, the oscillating current may include a DC offset (see, e.g., FIG. 8) to move the stuck heads towards the landing zone once they become unstuck. The magnitude of the DC offset may be determined through experimentation. The total lateral forces applied to the flexure arm should not exceed its lateral yield strength.

Figure 4A:
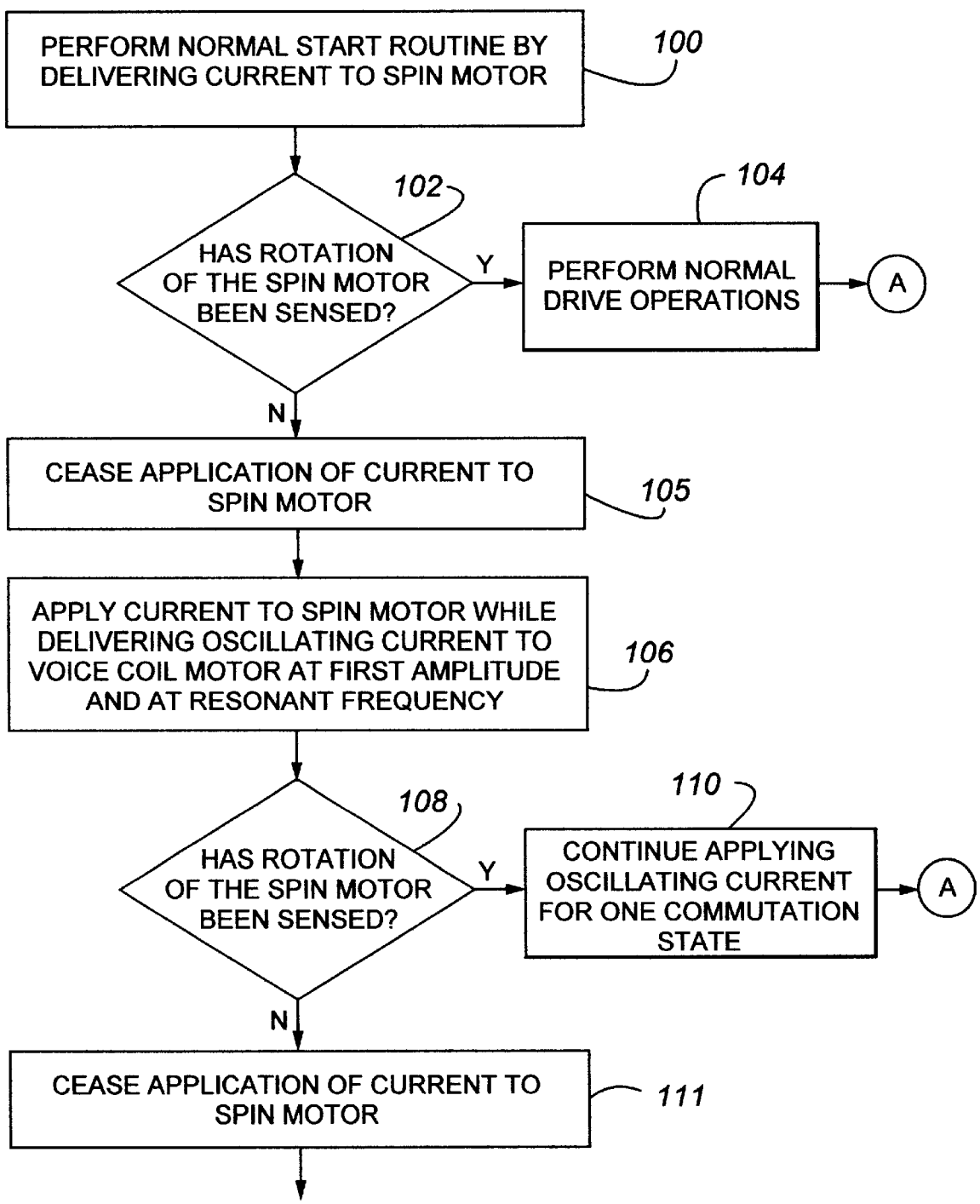
FIGS. 4A and 4B are portions of a flowchart illustrating one embodiment of the method of the present invention.
Figure 4B:
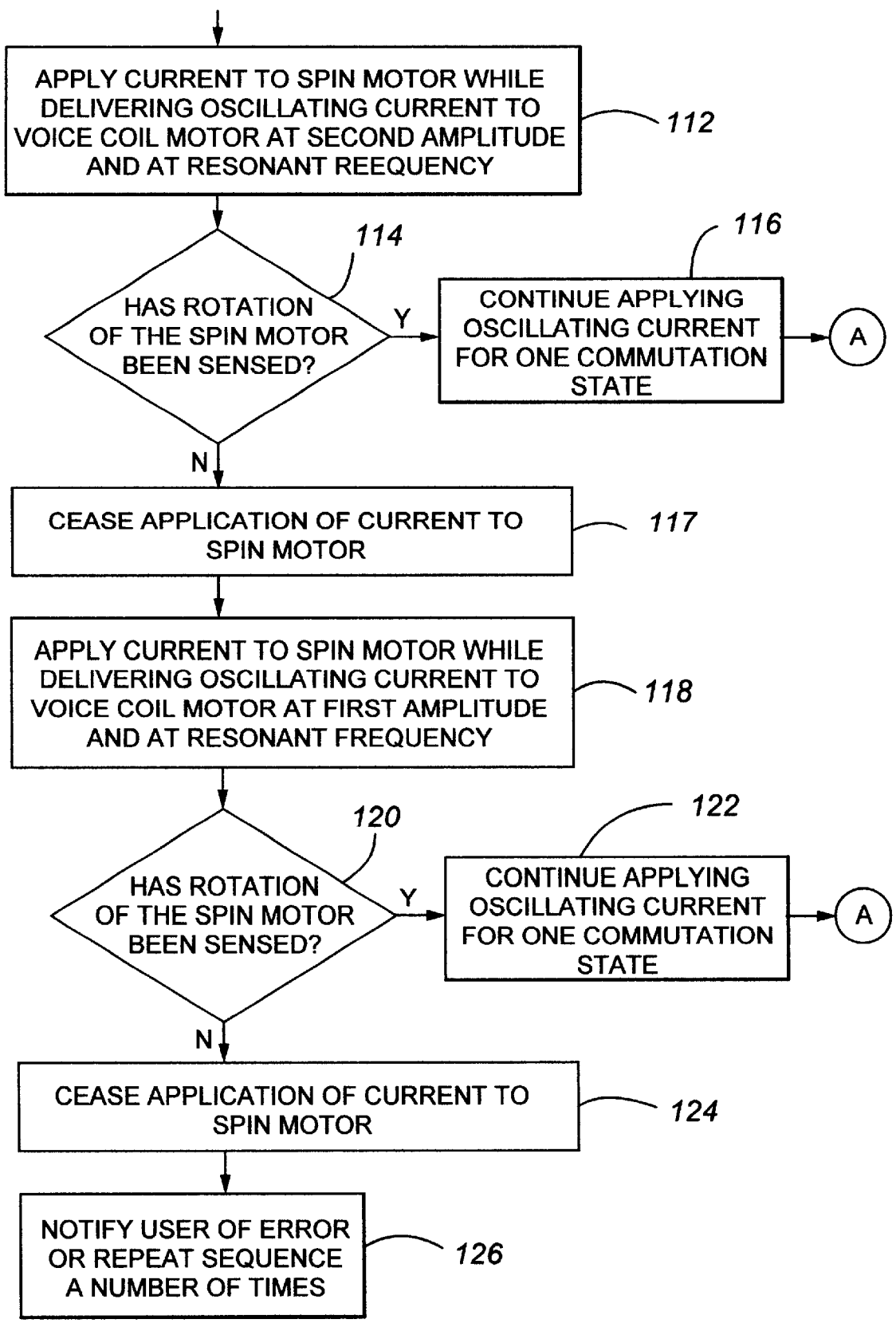

FIGS. 4A and 4B are portions of a flowchart which illustrates one embodiment of a method of the present invention. With reference to FIG. 4A, first, a DC current is delivered to the spin motor under the control of a microprocessor in an effort to perform a normal start routine (step 100). The microprocessor then determines whether the spin motor is rotating based upon a sensor associated with the spin motor, which delivers a signal to the microprocessor (step 102). If rotation of the spin motor is sensed, a stiction condition does not exist and normal drive operations are performed (step 104).

On the other hand, if rotation of the spin motor has not been sensed, a stiction condition is presumed to exist and application of current to the spin motor is ceased (step 105). Subsequently, a current is applied to the spin motor while a first oscillating current is delivered to the voice coil motor (wherein the current to the spin motor and the first oscillating current are applied in a synchronized manner under control of the microprocessor) at a first amplitude and at a resonant frequency corresponding to the disk drive actuator arm's lateral bending modes when all heads are stuck in the data zone (step 106). Preferably, the first amplitude corresponds with a current which is believed to be necessary to free one stuck head.

The microprocessor then determines whether the spin motor is rotating based upon the sensor associated with the spin motor, which delivers a signal to the microprocessor (step 108). If rotation of the spin motor is sensed, the stiction condition has been overcome, however, the oscillating current is still supplied to the voice coil motor for one commutation state to avoid re-stiction (step 110). Subsequently, normal drive operations are performed (step 104).

If rotation of the spin motor is not sensed in step 108, application of the current to the spin motor is ceased (step 111). Subsequently, a current is applied to the spin motor while a second oscillating current is delivered to the voice coil motor (wherein the current to the spin motor and the second oscillating current are applied in a synchronized manner under control of the microprocessor) at a second amplitude (greater than the first amplitude) (step 112). The second oscillating current has a frequency which corresponds to the resonant frequency of the lateral bending modes of the actuator arm of the disk drive when all heads are stuck in the data zone (step 112). Preferably, the second amplitude corresponds with a current which is believed to be necessary to free three stuck heads.

The microprocessor then determines whether the spin motor is rotating based upon the sensor associated with the spin motor, which delivers a signal to the microprocessor (step 114). If rotation of the spin motor is sensed, the stiction condition has been overcome, however, the oscillating current is still supplied to the voice coil motor for one commutation state to avoid re-stiction (step 116). Subsequently, normal drive operations are performed (step 104).

If rotation of the spin motor is not sensed in step 114, application of the current to the spin motor is ceased (step 117). Subsequently, a current is applied to the spin motor while a third oscillating current having a third amplitude (greater than the first and second amplitudes) is delivered to the voice coil motor, wherein the current to the spin motor and the third oscillating current are applied in a synchronized manner under the control of the microprocessor (step 118). The third oscillating current has a frequency which corresponds to the resonant frequency of the lateral bending modes of the actuator arm of the disk drive when all heads are stuck in the data zone (step 118). Preferably, the third amplitude corresponds with a current which is believed to be necessary to free five stuck heads.

The microprocessor then determines whether the spin motor is rotating based upon the sensor associated with the spin motor, which delivers a signal to the microprocessor (step 120). If rotation of the spin motor is sensed, the stiction condition has been overcome, however, the oscillating current is still supplied to the voice coil motor for one commutation state to avoid re-stiction (step 122). Subsequently, normal drive operations are performed (step 104).

If rotation of the spin motor is not sensed in step 120, the current to the spin motor is ceased (step 124). Subsequently, either a notification is provided to the user that an error has occurred and that the drive should be taken in for servicing, or the above-described sequence is repeated (step 126).

As will be understood by those skilled in the art, the present invention may be applied to disk drives having more or less than four disks and eight heads. It will also be understood by those skilled in the art that more or less than three oscillating currents of different amplitudes may be applied to the VCM, and that the amplitudes of such oscillating currents may vary based upon the number of heads in the disk drive.

Figure 5:
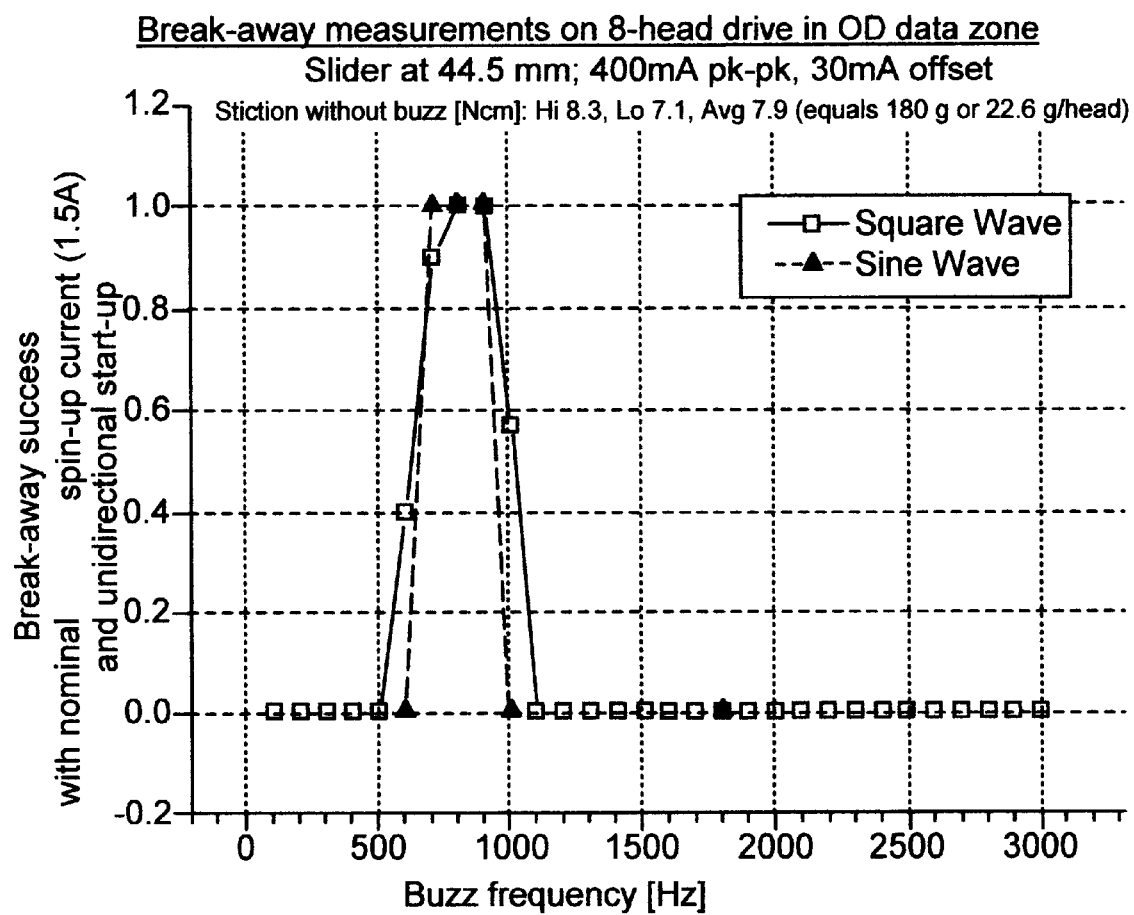
FIG. 5 illustrates the success of different frequencies in overcoming stiction for a given amplitude on an eight-head drive and illustrates the effectiveness of a sine wave as compared to a square wave in breaking stiction.

In arriving at the present invention (described in detail above), the inventors performed several studies some of which are described in FIGS. 5–13. FIG. 5 shows the success of different frequencies in breaking stiction for a given amplitude (1=100% success). In the case of FIG. 5, an oscillating current was applied together with motor torque and lasted 300 ms. The optimum frequency for a 200 mA amplitude can be explained by lateral modes as FIG. 6 suggests.

Figure 6:
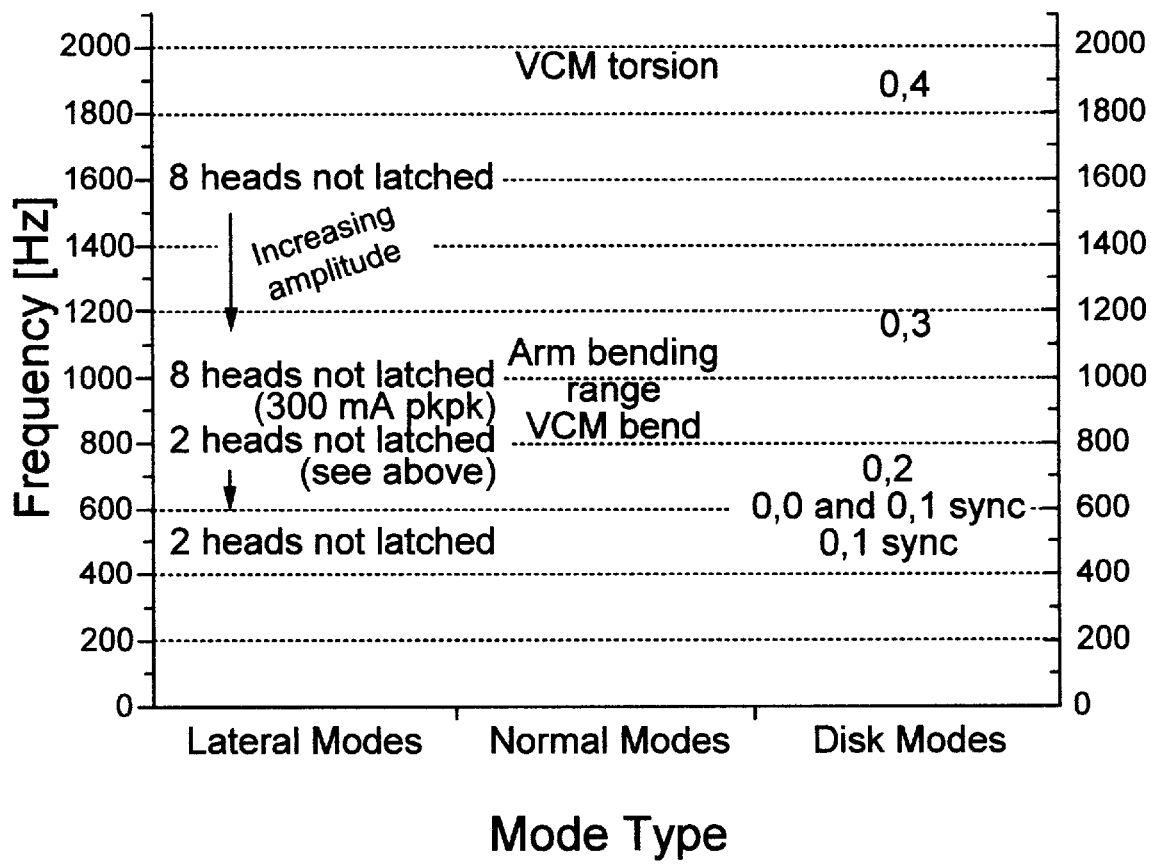
FIG. 6 illustrates some of the various modes of a stuck actuator in a disk drive system.

The inventors of present invention have recognized that the lateral modes of the stuck actuator arm have two important properties that affect the buzz algorithm. First, because dimple friction in the flexure results in non-linear resonance behavior, the lateral resonance frequency decreases with increasing current amplitude to the voice-coil motor. This is illustrated in FIG. 6. Second, the lateral resonance frequency of a stuck actuator is proportional to the square-root of the number of stuck heads (see FIGS. 6 and 8). This property is observed because the stuck heads act as system of parallel springs. As a consequence, the optimum buzz frequency depends upon the number of heads in the drive.

Figure 7:
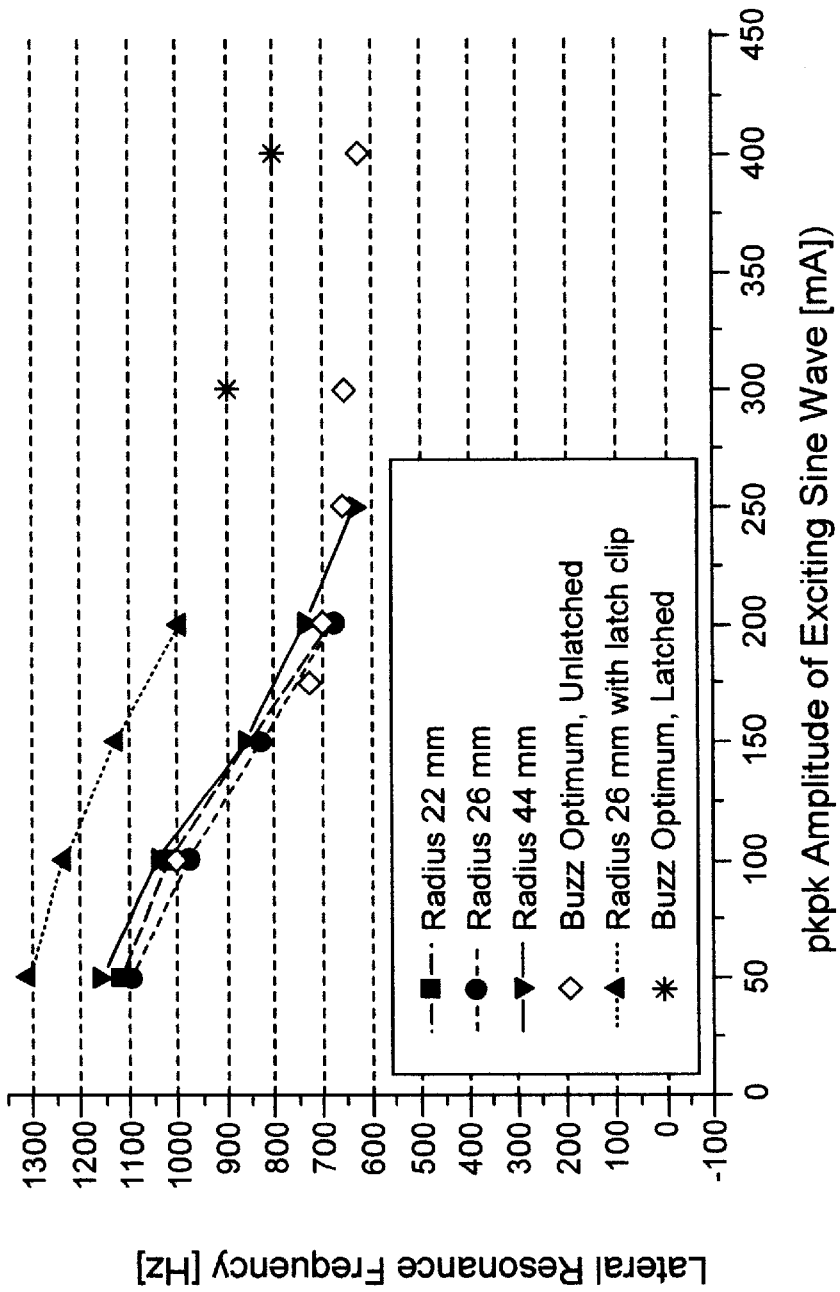
FIG. 7 illustrates that, as the amplitude of the exciting sine wave increases, the lateral resonance frequency and the optimum buzz frequency decrease, and that, when the actuator is stuck-and-latched, the latch will act as an additional parallel spring and will raise the lateral resonance frequency as compared to a stuck-and-unlatched actuator.

FIG. 7 illustrates the practical implications of the above-described properties of the lateral resonance. FIG. 7 shows that, as the amplitude of the exciting sine wave increases, the lateral resonance frequency and optimum buzz frequency decrease. Furthermore, when the actuator is stuck-and-latched, the latch will act as an additional parallel spring and will raise the lateral resonance frequency as compared to a stuck-and-unlatched actuator (also shown in FIG. 7).

With this knowledge, a drive's firmware can determine (or approximate) the optimum fixed buzz frequency. Specifically, if the firmware has knowledge of the number of heads in the drive, the firmware can scale the optimum buzz frequency based upon the square-root dependence of the lateral resonance on the number of heads, as described above. Furthermore, because the resonance frequency depends upon the buzz amplitude, which can be experimentally determined, the firmware can include a look-up table or simple approximating function to allow the firmware to tailor buzz frequency to amplitude level. Additionally, the firmware can attempt to distinguish between stuck-and-latched and stuck-and-unlatched cases. More specifically, the firmware would first assume that the actuator is latched-and-stuck, and would pick a buzz frequency that includes the additional latched spring. It would raise amplitudes as described above (see, e.g., FIGS. 4A and 4B). In the event of failure after trying the appropriate buzz frequency and amplitudes for a presumably stuck-and-latched case, the firmware would assume that the actuator is stuck-and-unlatched and a corresponding frequency would be selected for an unlatched-and-stuck actuator. Subsequently, the process of successively raising amplitudes, as necessary, would then be applied (see, e.g., FIGS. 4A and 4B).

One implementation (which is not preferred) uses three 270 ms bursts of buzz with a peak-to-peak amplitude of 200 mA into the actuator voice coil and a frequency chirp from 440 to 480 Hz.

Another implementation (which is the preferred implementation described above) uses three successive steps of 175, 350 and 600 mA amplitude at 800 Hz. The higher the amplitude, the wider the effective frequency band. In the preferred implementation, sweeping of the frequency is not necessary. Using a fixed frequency is advantageous because it is easy to implement in firmware and it can be easily determined for each drive.

The preferred buzz has three components:
1. The motor pulls at maximum torque in the correct direction (see U.S. patent application Ser. No. 09/493, 737 (now U.S. Pat. No. 6,369,541) entitled "Rotary Position Sensing During Rotor Acceleration in an Electric Motor" by Glenn Albert, filed concurrently herewith, and incorporated by reference);
2. The buzz is synchronized to start when the maximum motor current is applied; and
3. The frequency is tuned near a lateral resonance mode.

A buzz offset can be applied to the square wave so that the arm is moved to the ID once the heads are unstuck. The magnitude is found through experimentation. The total force (amplitude+offset) should not exceed the lateral yield strength of the flexure. As soon as the spindle controller detects start up, buzz is stopped to avoid damage to the drive.

Figure 8:
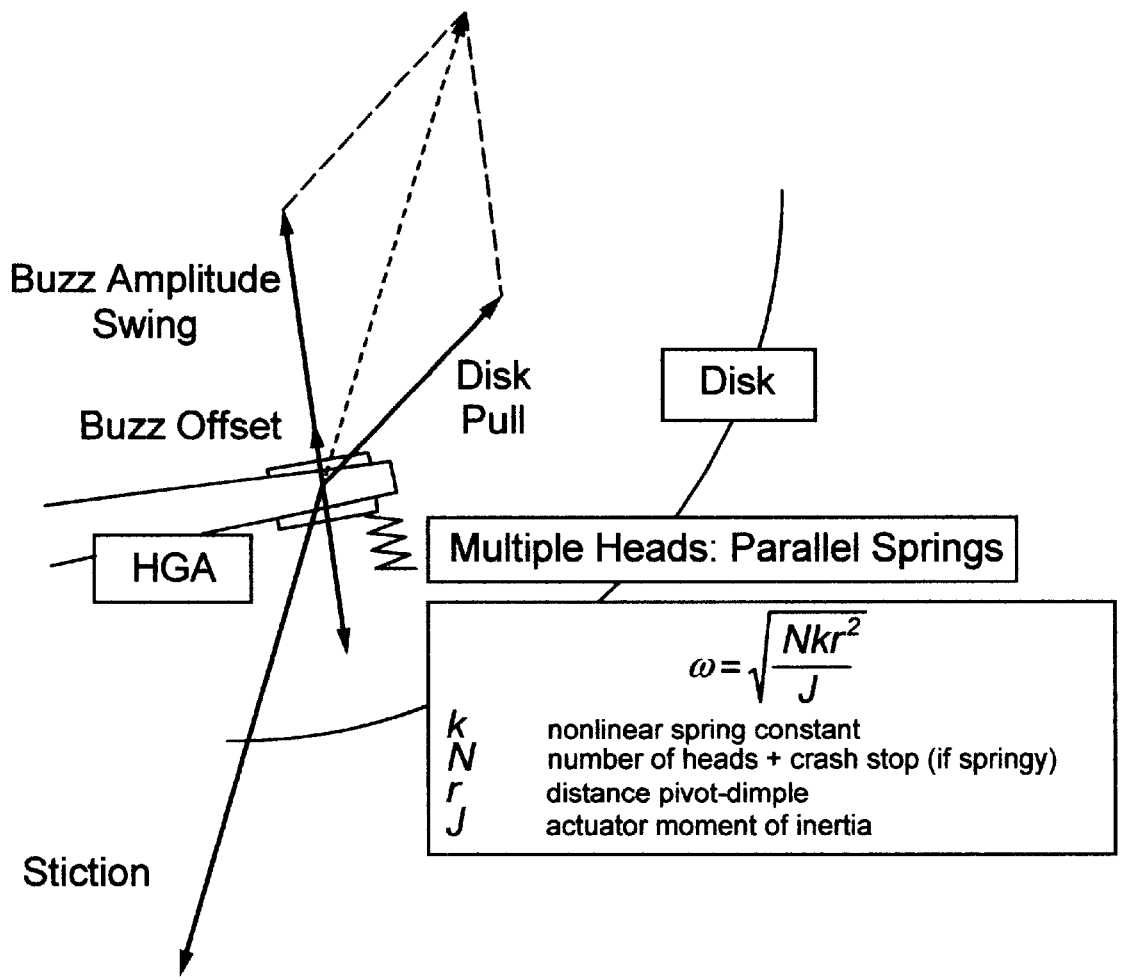
FIG. 8 is a force diagram illustrating how actuator buzz and spindle-pull work together to break stiction.

FIG. 8 illustrates how actuator buzz and spindle-pull work together to break stiction. A combined force vector of spindle-pull and buzz must be greater than the stiction force on the head as shown in FIG. 8. A buzz offset (towards the inner diameter of the disk) is also shown in FIG. 8.

An alternative to a square wave is a sine wave. FIG. 5 shows that a sine wave is as effective as a square wave in breaking stiction. The advantage of a sine wave is that it excites much fewer resonances in the HDA system and is therefore less audible. Its implementation is slightly more complex that implementing a square wave. One approach is to recall amplitude values from a look-up table.

Various features of one implementation of the invention are as follows:

1. Using buzz with unidirectional disk start-up.
2. Synchronization of buzz with unidirectional disk start-up.
3. Tuning to lateral actuator modes (in system when heads are stuck).
4. Stopping of buzz when system start up is detected.
5. Using a sine wave.
6. No sweeping of frequency (i.e., fixed frequency).

EXAMPLE

The Example that follows describes implementations of the invention. The Example begins with a brief overview of the problem and solution, followed by a description of product code and its evolution and effectiveness. Figures are presented that illustrate buzz recoveries from different initial conditions. The next section explains how the separated activities of buzzing the VCM and sensing the rotor position are synchronized while maintaining the full functionality of both. The final section presents additional implementations.

Problem

A problem with prior art disk drives is that heads stick repeatedly at OD, MD and ID data locations.

Solution

In general, lower amplitudes (60 mA–150 mA, peak-VCMs) and, therefore, higher frequencies (1000 Hz–1500 Hz) are effective at breaking free heads stuck at the ID data zones where spindle pull is strong, while higher amplitudes (150 mA–350 mA, peak) and lower frequencies (600 Hz–1000 Hz) work better as the stuck location moves toward the OD where spindle pull is weaker. The recommendation for implementing the buzz in stages, with the descending order of frequency (1200 Hz, 1000 Hz, 800 Hz), addresses what appears to be the most probable stuck condition (near ID) first, the next most probable second (MD), and so on, to minimize the amount of unnecessary buzzing and possible head/media wear it might cause. The duration of each buzz frequency step can be set to 300 ms as a starting point in the code implementation. Latter testing was predicated on applying full, positive spin motor torque (guaranteed by appropriate rotor position sensing code), while buzzing the VCM, and after breaking free. As one feature, continue to buzz for some time after disk motion commences, based on having observed cases where heads would immediately "re-stick" after successfully breaking free. This feature can be used in the product code. As another feature, apply an inward VCM bias current, while buzzing, of 75 mA, or more, to get the heads to the smallest possible radius, after they break free. For instance, the bias used is 75 mA.

Development Steps and Code Implementation

The code was first written to support a sequence of three programmable frequencies, and two independently programmable amplitudes, the first amplitude (175 mA, peak) to be used on the first try at each frequency and the second (350 mA) to be used on the repeat of the third frequency. After debug, the code was tested on five drives that had become stuck naturally. All five drives became unstuck by means of the new algorithm, and in each case the code required the third or fourth step (800 Hz, 175 mA, or 800 Hz, 350 mA) to succeed. Further testing on drives with heads deliberately stranded over data showed that, expect at the extreme ID data area, the algorithm progressed to the third or fourth step (800 Hz) almost every time before the heads would break free. Heads stuck at the extreme OD occasionally did not break free, even at the fourth level (800 Hz, 350 mA). An experiment using 800 Hz and 600 mA peak was consistently successful, at the extreme OD, on all of the drives used for this development.

It was also observed that when the heads did break free, independent of radius, it was almost always in the first 60 ms to 100 ms of a given 300 ms step. In an effort to minimize the time spent unnecessarily buzzing, the code was refined as follows. The structure was changed to support three (or more) independently programmable frequencies with three independently programmable amplitudes. All three frequencies were set to the "surefire" 800 Hz. Higher frequencies were omitted because the bench drives consistently failed to break free at those frequencies, while succeeding a t 800 Hz. Based on bench testing, the three amplitudes were chosen at 175 mA, 350 mA, and 600 mA, to cover roughly the one, three, and five sigma stuck cases, respectively. The duration of all steps was reduced to 120 ms from 300 ms, since any time spent beyond 80 ms was typically wasted. After several observations of the heads buzzing free, followed by some disk motion, and then "re-stiction", the code was modified to continue buzzing for the next entire commutation state, which solved this problem. With this structure, the opportunity for prolonged buzzing is greatly diminished, since the worst case total duration of all three steps cannot exceed 360 ms. This code worked in all cases; in general it breaks the heads free in less than 200 ms, and most often in 60 ms to 80 ms. From an audible noise perspective, this duration and amplitude are almost imperceptible.

Buzz Code Working

Figure 9:
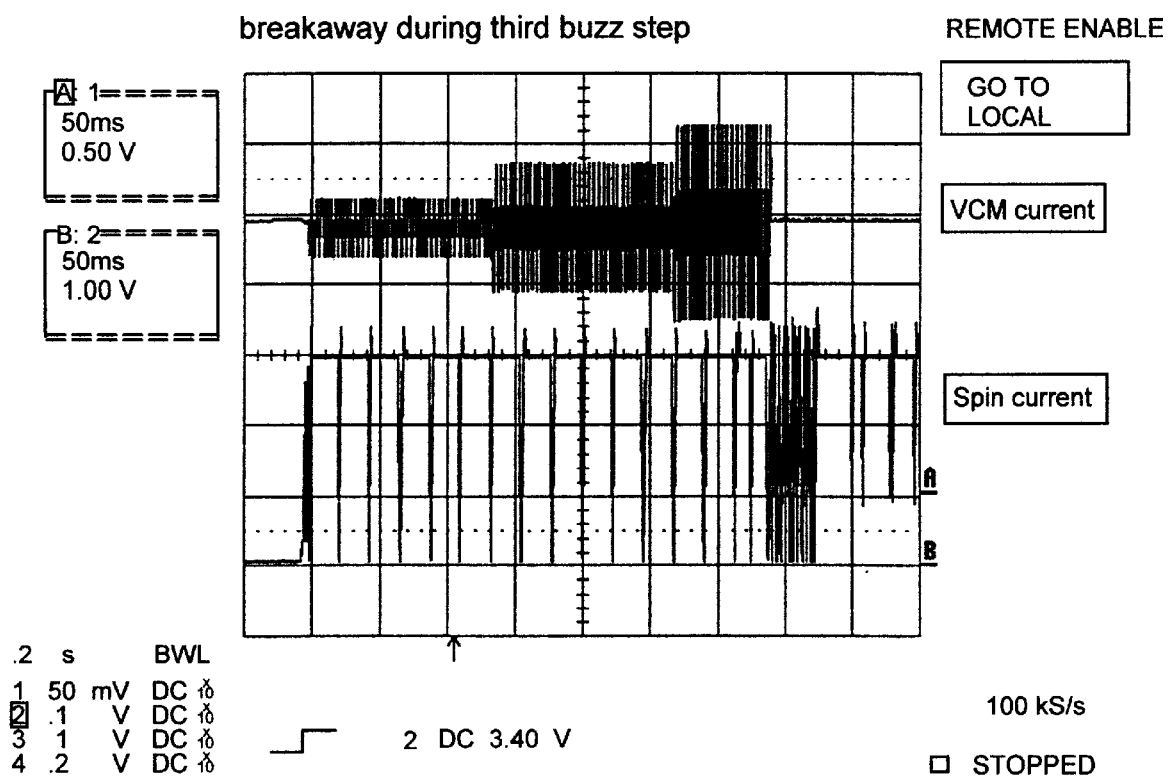
FIG. 9 illustrates a "third-step" buzz recovery for an eight-headed drive with heads stuck at the extreme outer diameter of the disk.
Figure 10:
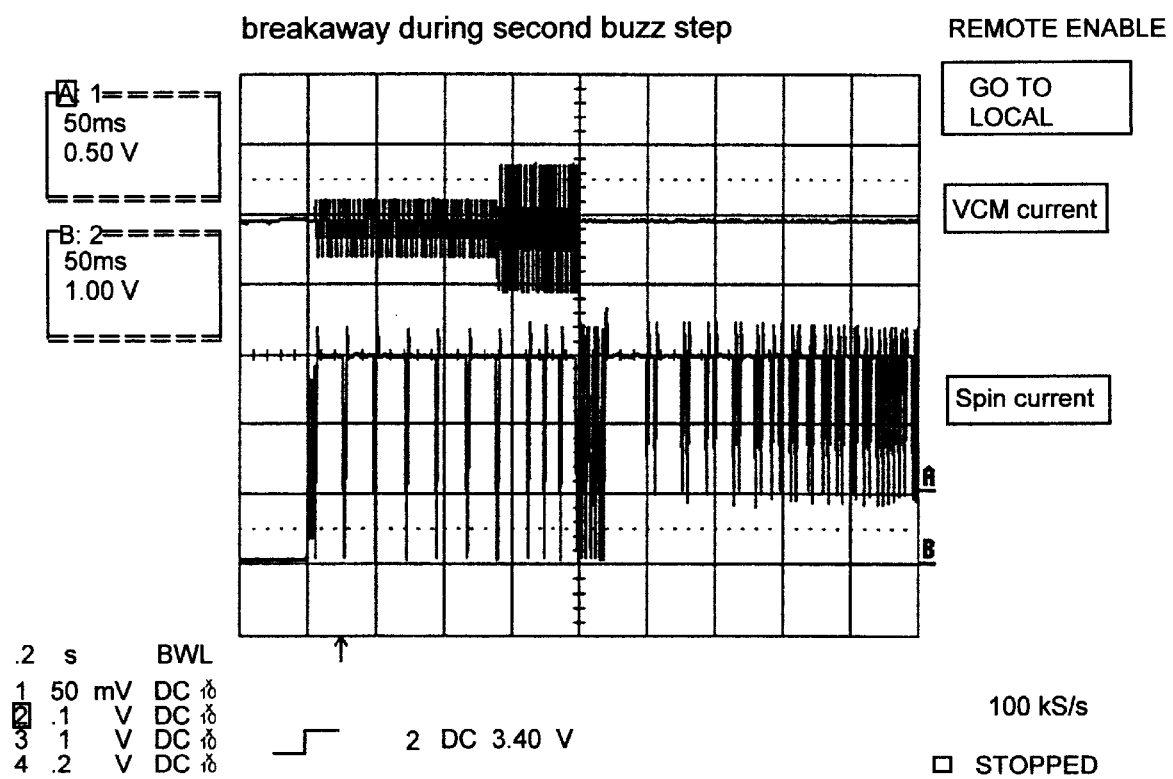
FIG. 10 illustrates a "second-step" buzz recovery for an eight-headed drive.
Figure 11:
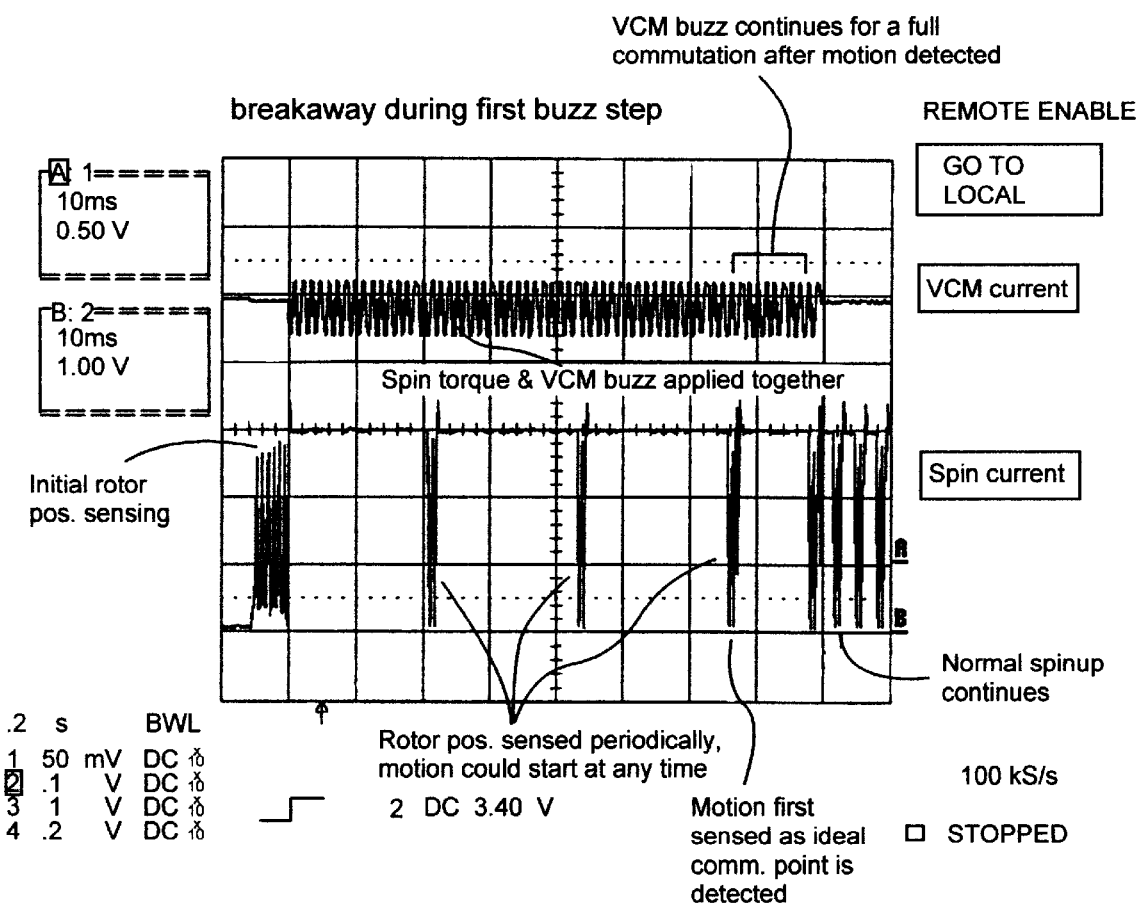
FIG. 11 illustrates a "first-step" buzz recovery for an eight-headed drive.
Figure 12:
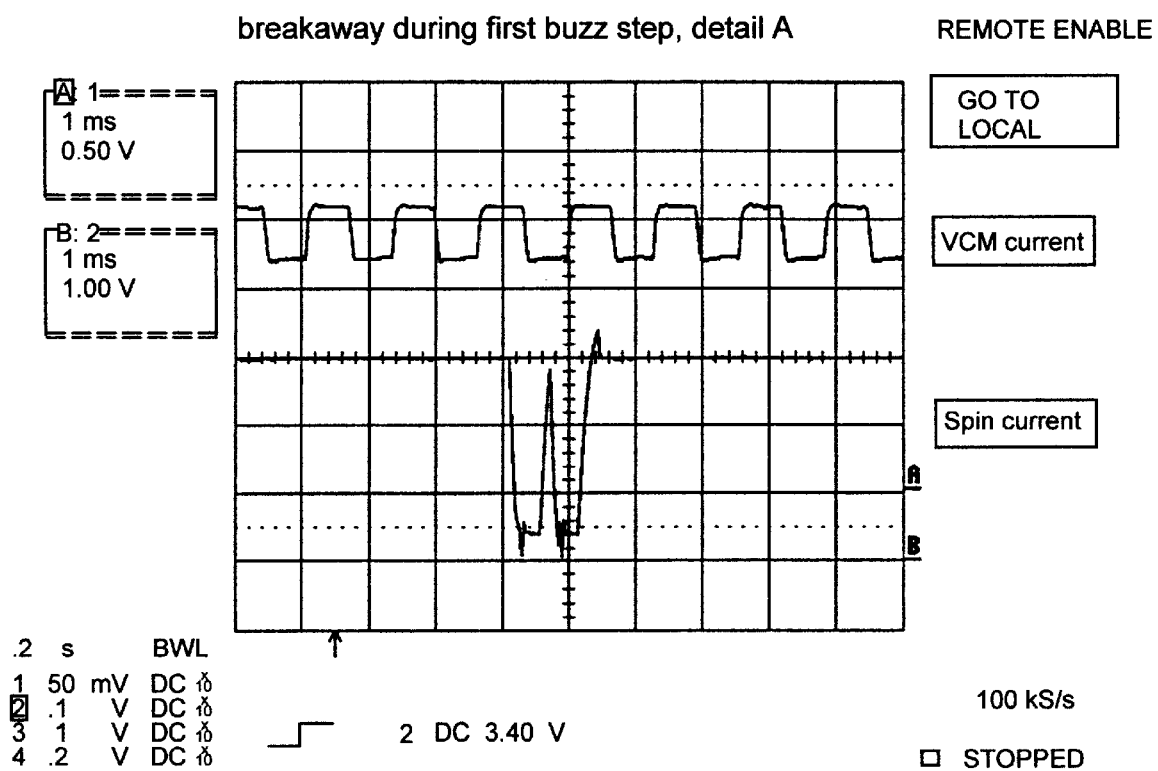
FIG. 12 is an expanded view of FIG. 11 showing how buzz frequency is undisturbed by the rotor sensing activity in the spin current, with which it is interleaved; and, FIG. 13 is a further expansion of FIG. 11 showing both buzz/rotor-sensing synchronization delay sequence and some code details.

FIG. 9 shows a "third-step" (800 Hz, 600 mA) buzz recovery for an eight-headed drive with heads stuck at the extreme OD. FIG. 10 shows a typical eight-header breaking free in the "second step" (800 Hz, 350 mA), and FIG. 11 shows a "first step" (800 Hz, 175 mA) success. FIG. 11 is also annotated to show the various parts of the sequence and how the activities of the VCM and spin control are related. Most drives tested at the bench recovered in the first step, even when heads were stuck at or beyond the MD. To get to the third step was rare, even when the heads were repeatedly forced to the OD. FIG. 12 is an expanded view of FIG. 11 showing how the buzz frequency is undisturbed by the rotor sensing activity in the spin current, with which it is interleaved. FIG. 13 is a further expansion of FIG. 11. Specifics about the synchronization of buzz and rotor-position sensing are presented in the next section.

Synchronizing Buzz Cycles with the Rotor-sensing Algorithm

Disk motion can be detected by periodically sensing the rotor position, using the same means as normal spinup. This technique is a separate topic (see U.S. patent application Ser. No. 09/493,737, now U.S. Pat. No. 6,369,541, entitled "Rotary Position Sensing During Rotor Acceleration in an Electric Motor" by Glenn Albert, incorporated herein by reference). Briefly, in the stuck case: once the initial position has been sensed, spin start torque is applied along with the VCM buzz, and subsequent periodic checks are made until motion is detected, at which time (after a complete commutation state with continued buzzing) the code transitions seamlessly to the normal spinup sequence.

The periodic check of the rotor position is a sequence of precisely time events, shown in the lower half of FIG. 13, that should not be interrupted. Since the VCM buzz is intended to excite a resonance, it should maintain constant timing (frequency) or risk killing the desired growing resonance. In order to maintain the integrity of both functions, they are synchronized so that each sequence executes simultaneously and yet does not interfere with the other. The details of this are presented in FIG. 13, along with an excerpt of definitions from SS_SEQU.INC.

This level of detail allows a code developer to change the range of buzz frequencies supported in the code. To change buzz frequencies, the developer simply changes the "BZ_FREQ" constant(s) in SS_SEQU.INC, and all the other constants are calculated at the time of assembly. A sample range is from 800 Hz to slightly over 1200 Hz. The range can be changed in a couple of ways. A higher range can be attained by decreasing BSD1 and a lower range by increasing BSD1. Further reduction in frequency can be achieved by increasing FALL_DLY1 and/or FALL_DLY2. These should not be decreased to attain a higher frequency range because it could lead to errors in the A-to-D conversions done in the rotor-sensing algorithm.

Additional Implementations

Change spinup error recovery to always assume, if failed, it is stuck. This gets around a problem in a higher current retry, with a low-offset zcross detector that shows ZCROSS activity even though the drive is still stuck. Previously, in this scenario, the stuck bit was not set.

Remove the 1200 Hz and 1000 Hz buzz steps and add three levels of VCM current for stepped buzz at 800 Hz and also modify the routine so buzzing would continue after the first start commutation, but stop after the second.

Add code required to implement higher frequency buzz code. New scheme increases the buzz amplitude from +/−100 to +/−175 mA, the buzz inward bias from 20 mA to 75 mA, and changes the frequency from 500 Hz to 1200 Hz, 1000 Hz, and 800 Hz in that order. Buzz bursts are 300 ms long with a fourth attempt being a repeat of the 800 Hz only with the buzz current increased to +/−350 mA. All buzz attempts are done with 1.75 mA of motor current applied after proper rotor sensing, just as before.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for overcoming a stiction condition in a disk drive, said method comprising:

providing a plurality of disks each having a pair of disk surfaces, each of the disk surfaces having a corresponding actuator arm assembly including a head;

providing a spin motor for rotating said plurality of disks when a stiction condition does not exist;

providing a voice coil motor for positioning said heads relative to said disk surfaces when a stiction condition does not exist;

providing a microprocessor for controlling application of a voice coil motor current to said voice coil motor and for controlling application of a spin motor current to said spin motor;

applying a spin motor current to said spin motor;

sensing that the spin motor is not rotating said plurality of disks and, hence, a stiction condition exists; and, applying a plurality of oscillating currents to said voice coil motor in response to said stiction condition, said plurality of oscillating currents each having a single fixed frequency equal to a resonant frequency of the disk drive's lateral bending modes when all of the heads are stuck, but differing amplitudes.

2. The method of claim 1 including the step of:

determining whether said spin motor is rotating in response to a first of said plurality of oscillating currents, wherein said first of said plurality of oscillating currents has a first amplitude.

3. The method of claim 2 including the step of:

applying a second of said plurality of oscillating currents to said voice coil motor after determining that said spin motor is not rotating, said second of said plurality of oscillating currents having a second amplitude, said second amplitude being greater than said first amplitude.

4. The method of claim 3 including the step of:

determining whether said spin motor is rotating in response to said second of said plurality of oscillating currents.

5. The method of claim 5 including the step of:

continuing to apply said second of said plurality of oscillating currents for at least one commutation state of said spin motor after determining that said spin motor is rotating in response to said second of said plurality of oscillating currents.

6. The method of claim 4 including the step of:

applying a third of said plurality of oscillating currents to said voice coil motor after determining that said spin motor is not rotating, said third of said plurality of oscillating currents having a third amplitude, said third amplitude being greater than said second amplitude.

7. The method of claim 6 including the step of:

determining whether said spin motor is rotating in response to said third of said plurality of oscillating currents.

8. The method of claim 7 including the step of:

continuing to apply said third of said plurality of oscillating currents for at least one commutation state of said spin motor after determining that said spin motor is rotating in response to said third of said plurality of oscillating currents.

9. The method of claim 7 including the step of:

outputting a notification to a user of the disk drive after determining that said spin motor is not rotating in response to said third of said plurality of oscillating currents.

10. The method of claim 2 wherein said determining step includes the step of: detecting rotor position of said spin motor, wherein said spin motor includes windings, using relative inductance measurements of said windings.

11. The method of claim 1 wherein said plurality of oscillating currents are sinusoidal waveforms.

12. The method of claim 11 wherein values of said sinusoidal waveforms are stored in a look-up table.

13. The method of claim 1 wherein the single fixed frequency is stored in non-volatile memory.

14. The method of claim 1 wherein application of the spin motor current and application of the plurality of oscillating currents to the voice-coil motor are synchronized.

15. The method of claim 1 wherein each of said plurality of oscillating currents is applied for less than approximately 120 ms.

16. The method of claim 1 wherein said microprocessor includes firmware, wherein said single fixed frequency is determined by said firmware, wherein said firmware is supplied with information relating to the number of heads in the drive, and wherein said firmware determines said single fixed frequency based upon a square-root dependence of the drive's lateral resonance on the number of heads.

17. A method for overcoming a stiction condition in a disk drive, said method comprising:

providing a plurality of disks each having a pair of disk surfaces, each of the disk surfaces having a corresponding actuator arm assembly including a head;

providing a spin motor for rotating said plurality of disks when a stiction condition does not exist;

providing a voice coil motor for positioning said heads relative to said disk surfaces when a stiction condition does not exist;

providing a microprocessor for controlling application of a voice coil motor current to said voice coil motor and for controlling application of a spin motor current to said spin motor;

applying a spin motor current to said spin motor;

sensing that the spin motor is not rotating said plurality of disks and, hence, a stiction condition exists;

applying a first oscillating current to said voice coil motor in response to said stiction condition, said first oscillating current having a fixed frequency and a first amplitude;

determining whether said spin motor is rotating in response to said first oscillating current; and, continuing to apply said first oscillating current for at least one commutation state of said spin motor after determining that said spin motor is rotating in response to said first oscillating current.

18. The method of claim 17 wherein said fixed frequency is equal to a resonant frequency of the disk drive's lateral bending modes when all of the heads are stuck.

19. The method of claim 17 wherein said first oscillating current is a sinusoidal waveform.

20. The method of claim 19 wherein values of said sinusoidal waveform are stored in a look-up table.

21. The method of claim 17 wherein the fixed frequency is stored in non-volatile memory.

22. The method of claim 17 wherein application of the spin motor current and application of the first oscillating current to the voice-coil motor are synchronized.

23. The method of claim 17 wherein the first oscillating current is applied for less than approximately 120 ms.

24. The method of claim 17 wherein the first amplitude of the first oscillating current in conjunction with any lateral resonance gain results in a force which, in combination with forces exerted by said spin motor due to the application of said spin motor current, is greater than a force necessary to break stiction.

25. The method of claim 24 wherein said actuator arm assembly includes a flexure arm having a lateral yield strength and wherein said force does not exceed the lateral yield strength of the flexure arm.

26. The method of claim 17 wherein said determining step includes the step of:

detecting a rotor position of said spin motor, wherein said spin motor includes windings, using relative inductance measurements of said windings.

27. The method of claim 17 wherein said first oscillating current is applied for only one commutation state of said spin motor after determining that said spin motor is rotating in response to said first oscillating current.

28. The method of claim 17 wherein said first oscillating current is applied for a fixed duration greater than one commutation state of said spin motor after determining that said spin motor is rotating in response to said first oscillating current.

29. A method for overcoming a stiction condition in a disk drive, said method comprising:

providing a plurality of disks each having a pair of disk surfaces, each of the disk surfaces having a corresponding actuator arm assembly including a head;

providing a spin motor for rotating said plurality of disks when a stiction condition does not exist;

providing a voice coil motor for positioning said heads relative to said disk surfaces when a stiction condition does not exist;

providing a microprocessor having firmware for controlling application of a voice coil motor current to said voice coil motor and for controlling application of a spin motor current to said spin motor;

applying a spin motor current to said spin motor;

sensing that the spin motor is not rotating said plurality of disks and, hence, a stiction condition exists;

applying a first oscillating current to said voice coil motor in response to said stiction condition, said first oscillating current having a frequency and an amplitude, wherein said frequency is determined by said firmware, wherein said firmware is supplied with information relating to the number of heads in the drive, and wherein said firmware determines said frequency based upon a square-root dependence of the drive's lateral resonance on the number of heads.

30. The method of claim 29 wherein said firmware determines said frequency based upon said amplitude.

31. The method of claim 30 wherein said firmware uses a look-up table to determine said frequency.

32. The method of claim 30 wherein said firmware uses an approximating function to determine said frequency.

33. The method of claim 29 wherein said firmware determines said frequency based upon said heads being latched-and-stuck.

34. The method of claim 29 wherein said firmware determines said frequency based upon said heads being unlatched-and-stuck.

35. The method of claim 29 including the step of:

determining whether said spin motor is rotating in response to said first oscillating current.

36. The method of claim 35 including the step of:

continuing to apply said first oscillating current for at least one commutation state of said spin motor after determining that said spin motor is rotating in response to said first oscillating current.

37. The method of claim 36 wherein said first oscillating current is applied for only one commutation state of said spin motor after determining that said spin motor is rotating in response to said first oscillating current.

38. The method of claim 36 wherein said first oscillating current is applied for a fixed duration greater than one commutation state of said spin motor after determining that said spin motor is rotating in response to said first oscillating current.

39. The method of claim 35 including the step of:

applying a second oscillating current to said voice coil motor after determining that said spin motor is not rotating, said second oscillating current having a second amplitude, said second amplitude being greater than said first amplitude.

40. The method of claim 39 including the step of:

determining whether said spin motor is rotating in response to said second oscillating current.

41. The method of claim 40 including the step of:
continuing to apply said second oscillating current for at least one commutation state of said spin motor after determining that said spin motor is rotating in response to said second oscillating current.

42. The method of claim 41 wherein said second oscillating current is applied for only one commutation state of said spin motor after determining that said spin motor is rotating in response to said second oscillating current.

43. The method of claim 41 wherein said second oscillating current is applied for a fixed duration greater than one commutation state of said spin motor after determining that said spin motor is rotating in response to said second oscillating current.

44. The method of claim 40 including the step of:
applying a third oscillating current to said voice coil motor after determining that said spin motor is not rotating, said third oscillating current having a third amplitude, said third amplitude being greater than said second amplitude.

45. The method of claim 44 including the step of:
determining whether said spin motor is rotating in response to said third oscillating current.

46. The method of claim 45 including the step of:
continuing to apply said third oscillating current for at least one commutation state of said spin motor after determining that said spin motor is rotating in response to said third oscillating current.

47. The method of claim 46 wherein said third oscillating current is applied for only one commutation state of said spin motor after determining that said spin motor is rotating in response to said third oscillating current.

48. The method of claim 46 wherein said third oscillating current is applied for a fixed duration greater than one commutation state of said spin motor after determining that said spin motor is rotating in response to said third oscillating current.

49. A method for overcoming a stiction condition in a disk drive, said method comprising:
providing a plurality of disks each having a pair of disk surfaces, each of the disk surfaces having a corresponding actuator arm assembly including a head;
providing a spin motor for rotating said plurality of disks when a stiction condition does not exist;
providing a voice coil motor for positioning said heads relative to said disk surfaces when a stiction condition does not exist;
providing a microprocessor for controlling application of a voice coil motor current to said voice coil motor and for controlling application of a spin motor current to said spin motor;
applying a spin motor current to said spin motor;
sensing that the spin motor is not rotating said plurality of disks and, hence, a stiction condition exists;
applying a first oscillating current to said voice coil motor in response to said stiction condition, said first oscillating current having a fixed frequency and a first amplitude;
determining whether said spin motor is rotating in response to said first oscillating current;
applying a second oscillating current to said voice coil motor after determining that said spin motor is not rotating, said second oscillating current having a second amplitude and a frequency equal to said fixed frequency, said second amplitude being greater than said first amplitude;
determining whether said spin motor is rotating in response to said second oscillating current; and,
continuing to apply said second oscillating current for at least one commutation state of said spin motor after determining that said spin motor is rotating in response to said second oscillating current.

50. The method of claim 49 wherein said second oscillating current is applied for only one commutation state of said spin motor after determining that said spin motor is rotating in response to said second oscillating current.

51. The method of claim 49 wherein said second oscillating current is applied for a fixed duration greater than one commutation state of said spin motor after determining that said spin motor is rotating in response to said second oscillating current.

52. A method for overcoming a stiction condition in a disk drive, said method comprising:
providing a plurality of disks each having a pair of disk surfaces, each of the disk surfaces having a corresponding actuator arm assembly including a head;
providing a spin motor for rotating said plurality of disks when a stiction condition does not exist;
providing a voice coil motor for positioning said heads relative to said disk surfaces when a stiction condition does not exist;
providing a microprocessor for controlling application of a voice coil motor current to said voice coil motor and for controlling application of a spin motor current to said spin motor;
applying a spin motor current to said spin motor;
sensing that the spin motor is not rotating said plurality of disks and, hence, a stiction condition exists;
applying a first oscillating current to said voice coil motor in response to said stiction condition, said first oscillating current having a fixed frequency and a first amplitude;
determining whether said spin motor is rotating in response to said first oscillating current;
applying a second oscillating current to said voice coil motor after determining that said spin motor is not rotating, said second oscillating current having a second amplitude and a frequency equal to said fixed frequency, said second amplitude being greater than said first amplitude;
determining whether said spin motor is rotating in response to said second oscillating current;
applying a third oscillating current to said voice coil motor after determining that said spin motor is not rotating, said third oscillating current having a third amplitude and a frequency equal to said fixed frequency, said third amplitude being greater than said second amplitude;
determining whether said spin motor is rotating in response to said third oscillating current; and,
continuing to apply said third oscillating current for at least one commutation state of said spin motor after determining that said spin motor is rotating in response to said third oscillating current.

53. The method of claim 52 wherein said third oscillating current is applied for only one commutation state of said spin motor after determining that said spin motor is rotating in response to said third oscillating current.

54. The method of claim 52 wherein said third oscillating current is applied for a fixed duration greater than one commutation state of said spin motor after determining that said spin motor is rotating, in response to said third oscillating current.

* * * * *